US009179101B2

(12) United States Patent
Kurose

(10) Patent No.: US 9,179,101 B2
(45) Date of Patent: *Nov. 3, 2015

(54) VIDEO RECEIVING APPARATUS AND BROADCAST RECEIVING APPARATUS

(71) Applicant: Funai Electric Co., Ltd., Osaka (JP)

(72) Inventor: Takahiro Kurose, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/220,363

(22) Filed: Mar. 20, 2014

(65) Prior Publication Data

US 2014/0205094 A1 Jul. 24, 2014

Related U.S. Application Data

(62) Division of application No. 12/155,298, filed on Jun. 2, 2008, now Pat. No. 8,719,955.

(30) Foreign Application Priority Data

Jun. 5, 2007 (JP) .................................. 2007-148732

(51) Int. Cl.
*H04L 29/06* (2006.01)
*H04N 7/167* (2011.01)
*H04N 5/775* (2006.01)
*H04N 21/436* (2011.01)

(52) U.S. Cl.
CPC ............. *H04N 7/1675* (2013.01); *H04N 5/775* (2013.01); *H04N 21/43615* (2013.01); *H04N 21/43622* (2013.01)

(58) Field of Classification Search
CPC ................................ H04N 7/1675; G06F 7/58

USPC ............................................. 380/239; 726/29
See application file for complete search history.

(56) References Cited

U.S. PATENT DOCUMENTS

| | | | |
|---|---|---|---|
| 6,914,637 B1 * | 7/2005 | Wolf et al. | 348/473 |
| 7,035,290 B1 * | 4/2006 | Lyle | 370/498 |
| 7,176,980 B2 * | 2/2007 | Stone et al. | 348/558 |
| 7,502,470 B2 * | 3/2009 | Hanko et al. | 380/200 |
| 7,690,006 B2 * | 3/2010 | Birnbaum et al. | 719/328 |
| 7,702,925 B2 * | 4/2010 | Northcutt et al. | 713/193 |
| 7,752,673 B2 * | 7/2010 | Fujiwara | 726/26 |
| 7,752,675 B2 * | 7/2010 | Lee | 726/26 |
| 7,761,417 B2 * | 7/2010 | Fernandez | 707/621 |

(Continued)

FOREIGN PATENT DOCUMENTS

| | | |
|---|---|---|
| JP | 2005051547 | 2/2005 |
| JP | 2006246300 | 9/2006 |

*Primary Examiner* — David Garcia Cervetti
(74) *Attorney, Agent, or Firm* — Morgan, Lewis & Bockius LLP

(57) ABSTRACT

An video receiving apparatus which reduces waiting time till image is displayed on a monitor include: a plurality of authentication executing units which perform respectively an authentication process to the external devices connected to each of the plurality of input terminals; a terminal selecting unit which selects one of the plurality of input terminals as a video input terminal based on an operation input from outside; an video receiving unit which receives the video information through one of the authentication executing units corresponding to the selected input terminal from the external devices connected through the selected input terminal; and a display control unit which outputs the received video information to a monitor.

14 Claims, 4 Drawing Sheets

(56) References Cited

U.S. PATENT DOCUMENTS

| | | | |
|---|---|---|---|
| 7,761,709 B2* | 7/2010 | Choi | 713/168 |
| 7,900,047 B2* | 3/2011 | Lyle | 713/171 |
| 8,065,524 B2* | 11/2011 | Iwamoto et al. | 713/168 |
| 2005/0027993 A1* | 2/2005 | Yanagisawa | 713/189 |
| 2005/0144468 A1* | 6/2005 | Northcutt et al. | 713/189 |
| 2005/0154917 A1* | 7/2005 | deCarmo | 713/201 |
| 2006/0028362 A1* | 2/2006 | Fujiwara | 341/110 |
| 2006/0075201 A1* | 4/2006 | Mizutani et al. | 711/162 |
| 2006/0280449 A1* | 12/2006 | Ogawa et al. | 386/95 |
| 2006/0288234 A1* | 12/2006 | Azar et al. | 713/186 |
| 2006/0291569 A1* | 12/2006 | Kabuto et al. | 375/240.25 |
| 2007/0130625 A1* | 6/2007 | Lee | 726/26 |
| 2007/0162738 A1* | 7/2007 | Kim | 713/100 |
| 2007/0208939 A1* | 9/2007 | Iwamoto et al. | 713/168 |
| 2007/0220279 A1* | 9/2007 | Northcutt et al. | 713/193 |
| 2008/0025707 A1* | 1/2008 | Sawada et al. | 386/126 |
| 2008/0059992 A1* | 3/2008 | Amidon et al. | 725/25 |
| 2008/0094525 A1* | 4/2008 | Song | 348/739 |
| 2008/0115013 A1* | 5/2008 | Jung et al. | 714/39 |
| 2008/0127330 A1* | 5/2008 | Seo | 726/20 |
| 2008/0148063 A1* | 6/2008 | Hanko et al. | 713/189 |
| 2008/0159532 A1* | 7/2008 | Verma | 380/210 |
| 2008/0170839 A1* | 7/2008 | Choi | 386/124 |
| 2008/0205857 A1* | 8/2008 | Kikkawa et al. | 386/124 |
| 2008/0240230 A1* | 10/2008 | Oxman et al. | 375/240.01 |
| 2008/0244097 A1* | 10/2008 | Candelore et al. | 710/5 |
| 2008/0247544 A1* | 10/2008 | Candelore et al. | 380/241 |
| 2008/0252782 A1* | 10/2008 | Komeno | 348/512 |
| 2008/0270635 A1* | 10/2008 | Nakahama | 710/8 |
| 2011/0052141 A1* | 3/2011 | Takatsuji et al. | 386/231 |
| 2011/0271296 A1* | 11/2011 | Tu et al. | 725/25 |
| 2011/0277020 A1* | 11/2011 | Morita et al. | 726/5 |

* cited by examiner

VIDEO RECEIVING APPARATUS AND BROADCAST RECEIVING APPARATUS

This application is a Divisional of U.S. patent application Ser. No. 12/155,298, filed on Jun. 2, 2008, which has matured to U.S. Pat. No. 8,719,955, which issued on May 6, 2014, and claims priority under 35 U.S.C. 119 and 35 U.S.C. 365 to Japanese Patent Application No. 2007-148732, filed on Jun. 5, 2007, which are hereby incorporated by reference in their entirety.

BACKGROUND OF THE INVENTION

1. Field of the Invention

The present invention relates to a video receiving apparatus which is equipped with a plurality of input terminals and structured to output video information input from an external device through one input terminal which is selected from the plurality of input terminals to a monitor. The present invention also relates to a broadcast receiving apparatus structured to receive a television broadcast and output received video information to a monitor.

2. Description of Related Art

Heretofore, it is common to connect an external device which outputs video information and an video receiving instrument which receives the video information from the external device and displays it on a monitor utilizing analog connection such as component connection. However, the analog connection is susceptible to noise, so video signal is made deteriorated. To solve this problem, High-Definition Multimedia Interface (HDMI) standard to connect the external device and the video receiving instrument by digital connection, is defined. Further, though there is fear for an illegal copy in case of the digital connection, sending and receiving the video signal is possible only between instruments which succeed in authentication by adopting High-bandwidth Digital Contents Protection (HDCP) which is technology to prevent the illegal copy in HDMI.

Various kinds of apparatuses and methods according to the above described HDMI standard to perform the authentication in the HDCP system are proposed. For example, an Audio/Visual (AV) signal receiving instrument which includes: a digital interface to receive the digital AV signal containing illegal copy preventing signal; an authenticating device to perform permission authentication for the A/V signal output to an external device through the interface; authentication result display device to display result of performed authentication to user; and a control device which judges result of the authentication and outputs it to the authentication result display device, is proposed (See, JP-A-2006-246300).

However, in case where the conventional video receiving apparatus such as the above described A/V signal receiving instrument and the like is equipped with a plurality of input terminals and the conventional receiving apparatus is structured to output the video information which is input from an external device through one input terminal that is selected from the plurality of input terminals to a monitor, because the HDCP authentication process is executed every time when the input terminal to which the video information is input is changed, it causes a problem that time to be required for the HDCP authentication process becomes long, and waiting time till the image is displayed on the monitor becomes long.

SUMMARY OF THE INVENTION

The present invention is made in view of the above described problem and it is an object of the present invention to provide an video receiving apparatus and a broadcast receiving apparatus which can reduce waiting time till an image is displayed on a monitor.

To attain the above described object, an video receiving apparatus according to a first aspect of the present invention is equipped with a plurality of input terminals and configured to output video information input from a plurality of external devices through each of the plurality of input terminals to a monitor, the video receiving apparatus is characterized by including: a plurality of authentication executing units which perform respectively an authentication process to the external devices connected to each of the plurality of input terminals; a terminal selecting unit which selects one of the plurality of input terminals as a video input terminal based on an operation input from outside; an video receiving unit which receives the video information through one of the authentication executing units corresponding to the selected input terminal from the external devices connected through the selected input terminal; and a display control unit which outputs the video information received by the video receiving unit to the monitor.

The video receiving apparatus according to a second aspect of the present invention is characterized in that the input terminals are input terminals according to High-Definition Multimedia Interface (HDMI) standard in the above described video receiving apparatus of the first aspect.

The video receiving apparatus according to a third aspect of the present invention is characterized in that the authentication executing units perform the authentication process in High-bandwidth Digital Content Protection (HDCP) system in the above described video receiving apparatus of the first or second aspect.

The video receiving apparatus according to a fourth aspect of the present invention further includes a connection judging unit which judges whether, or not, each of the plurality of input terminals is connected to the external devices, wherein the authentication executing unit or authentication executing units that correspond(s) to the input terminal or input terminals judged to be connected with the external devices by the connection judging unit, perform(s) the authentication process to the connected external devices in the above described video receiving apparatus of the first to third aspects.

The video receiving apparatus according to a fifth aspect of the present invention is characterized in that the authentication executing units include a plurality of authentication Integrated Circuits (ICs), the authentication ICs performing the authentication process to the external devices, and the authentication executing units performing the authentication process through the authentication ICs in the above described video receiving apparatus of the first to fourth aspect.

A broadcast receiving apparatus according to a sixth aspect of the present invention includes the video receiving apparatus according to above described first to fifth aspect and a broadcast receiving unit which receives a television broadcast, and the broadcast receiving apparatus is characterized in that the broadcast receiving apparatus outputs at least one of video information received through the broadcast receiving unit, and the video information input from the external devices through the input terminal selected as a video input terminal of the video receiving apparatus.

According to the video receiving apparatus according to the first aspect of the present invention, the plurality of authentication executing units respectively perform the authentication process to the external devices connected to each of the plurality of input terminals. Then, an operation input from outside is received, and one input terminal is selected from the plurality of input terminals as a video input terminal based on the received operation input. The video information is received from the external device connected through the selected input terminal, then through an authentication executing unit that corresponds to the selected input terminal, and the received video information is output to a monitor. As a result, waiting time until the image is displayed on the monitor, can be reduced.

That is, because the plurality authentication executing units respectively perform the authentication process to the external devices connected to each of the plurality of input terminals, it is not necessary to start the authentication process from the time point when the input terminal is selected as the video input terminal, the waiting time till the image is displayed on the monitor, can be reduced.

That is, at the time point when an external device is connected to an input terminal, for example, if an authentication executing unit corresponding to the input terminal perform authentication process to the external device connected to the input terminal, the authentication process has been completed already (or the authentication process is being performed) at the time point when the input terminal is selected as the video input terminal. As a result, it is not necessary to start the authentication process from the time point when the input terminal is selected.

According to the video receiving apparatus according to the second aspect of the present invention, because the input terminal is an input terminal according to High-Definition Multimedia Interface (HDMI) standard, digital communication according to the HDMI standard can be performed with the external device.

According to the video receiving apparatus according to the third aspect of the present invention, because the authentication process according to High-bandwidth Digital Content Protection (HDCP) system, is performed, illegal copy can be surely prevented.

According to the video receiving apparatus according to the fourth aspect of the present invention, it is judged whether or not each of the plurality of input terminals is connected to the external devices. If it is judged that the external device is connected, the authentication executing unit corresponding to the input terminal judged to be connected with the external device, performs the authentication process to the connected external device. As a result, the waiting time until the image is displayed on a monitor can be surely reduced.

That is, because the plurality of authentication executing units respectively perform the authentication process to the external devices connected to each of the plurality of input terminals, it is not necessary to start the authentication process from the time point when one input terminal is selected as the video input terminal, the waiting time till the image is displayed on the monitor, can be surely reduced.

That is, at the time point when an external device is connected to an input terminal, if an authentication executing unit corresponding to the input terminal perform authentication process in advance to the external device connected to the input terminal, the authentication process has been completed already (or the authentication process is being performed) at the time point when the input terminal is selected as the video input terminal. As a result, it is not necessary to start the authentication process from the time point when the input terminal is selected.

According to the video receiving apparatus according to the fifth aspect of the present invention, the authentication executing units include a plurality of authentication ICs performing the authentication process to the external devices, and the authentication executing units perform the authentication process through the authentication ICs. Therefore, the waiting time until the image is displayed on the monitor, can be more surely reduced.

That is, because the authentication executing units include the authentication ICs which perform the authentication process to the external devices, and the authentication process is performed in advance through the authentication ICs, when the authentication is completed by the authentication ICs, a state where the authentication is completed can be maintained, that is, exchange of an authentication key can be performed continuously with the external devices. As a result, the waiting time until the image is displayed on the monitor, can be more surely reduced.

The broadcast receiving apparatus according to the sixth aspect of the present invention includes the video receiving apparatus according to above described first to fifth aspect. Because at least one of video information which is received through the television broadcast, and video information which is input from the external device through an input terminal that is selected as the video input terminal of the video receiving apparatus, is output to the monitor, a broadcast receiving apparatus which can reduce the waiting time till the image is displayed on the monitor, can be realized.

DETAILED DESCRIPTION OF PREFERRED EMBODIMENTS

Figure 1:
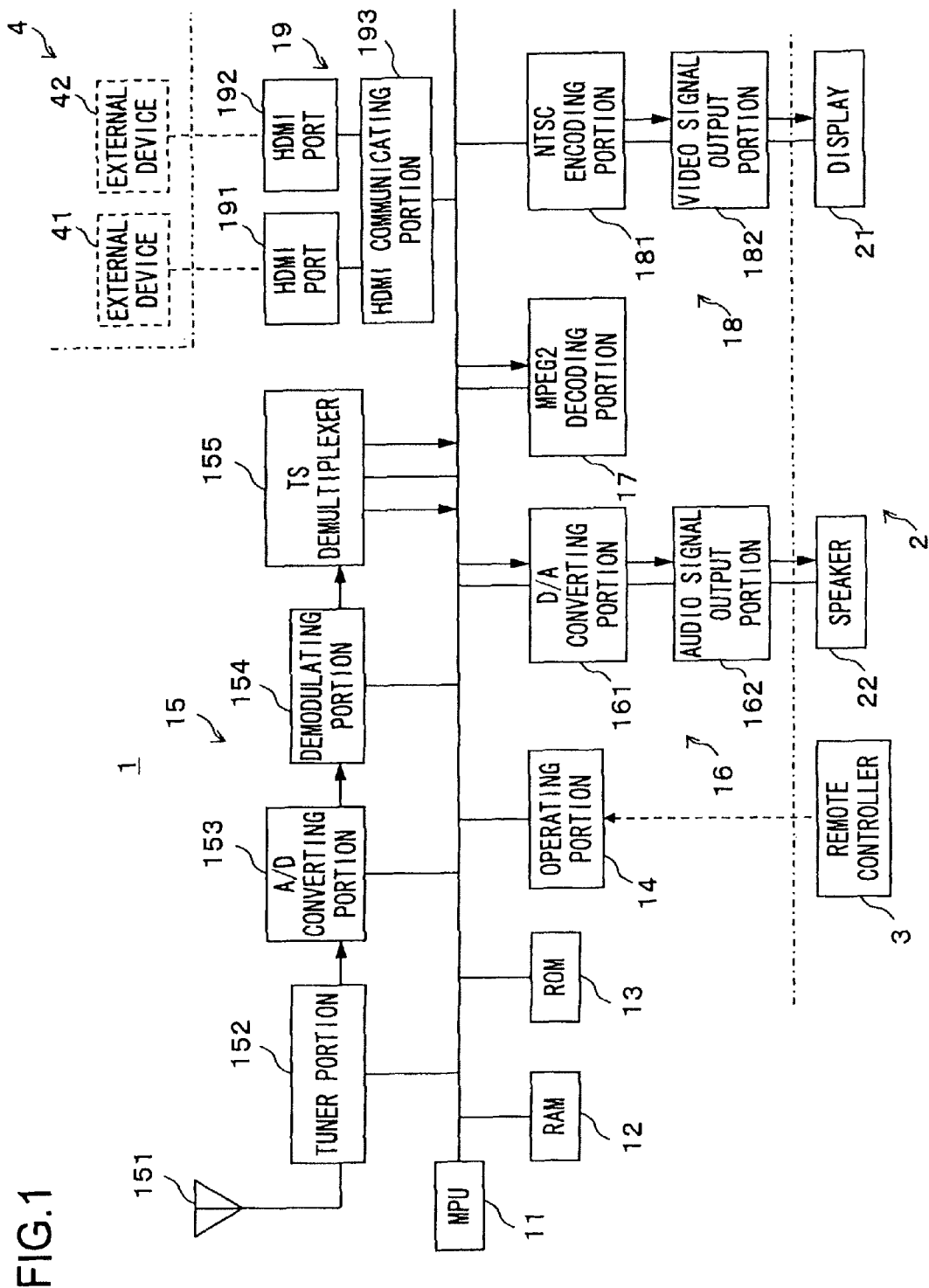
FIG. 1 is a block diagram to show one example of structure of a digital broadcast receiving apparatus according to one embodiment of the present invention.

Hereinafter, embodiment of the present invention will be explained with reference to attached drawings. FIG. 1 is a block diagram to show one example of structure of a digital broadcast receiving apparatus according to one embodiment of the present, invention. The digital broadcast receiving apparatus 1 (corresponding to an video receiving apparatus or a broadcast receiving apparatus) is connected to an output device 2 in a communicatable manner and is also connected to a remote controller 3 in a communicatable manner via infrared communication.

The digital broadcast receiving apparatus 1 receives an operating input through the remote controller 3 from user, receives a television broadcast in digital system based on the received operating input, displays received video information on a display 21 and at the same time outputs received audio information to a speaker 22. Further, the digital broadcast receiving apparatus 1 receives the operating input through the remote controller 3 from user, based on the received operating input, displays video information which is input from an external device 4 such as a digital versatile disc (DVD) player or the like which is connected through an external device connecting portion 19 on the display 21 and at the same time outputs input audio information to the speaker 22.

The output device 2 is equipped with the display 21 and the speaker 22, to output the audio information and the video information which are input from the digital broadcast receiving apparatus 1. The display 21 (corresponding to a monitor) is equipped with liquid crystal display (LCD), plasma display panel (PDP) or the like, to display the video information which is input from the digital broadcast receiving apparatus 1 to outside in visible manner. The speaker 22 outputs the audio information which is input from the digital broadcast receiving apparatus 1.

The remote controller 3 (corresponding to a part of terminal selecting unit) receives the operating input from user, generates infrared signal which corresponds to the received operating input, and output the signal to the digital broadcast receiving apparatus 1.

The digital broadcast receiving apparatus 1 is equipped with a micro processing unit (MPU) 11, a random access memory (RAM) 12, a read only memory (ROM) 13, an operating portion 14, a receiving portion 15, an audio output portion 16, a Motion Picture Experts Group (MPEG) 2 decoding portion 17, a video output portion 18, and external device connecting portion 19.

The MPU11 controls operation of the whole digital broadcast receiving apparatus 1. The RAM 12 stores information such as the audio information, the video information, and the like in readable and writable manner. The ROM13 stores control program and the like to activate the MPU 11.

The operating portion 14 receives various operations such as power on and off, channel selecting, selection of outside input, and the like to perform the operation. The selection of the outside input, means selection between HDMI ports 191 and 192 to receive, for example, video information that is output to the display 21 and the like. The operating portion 14 also receives an operating signal from the remote controller 3 via infrared communication to perform the various operations. The receiving portion 15 (corresponding to a broadcast receiving unit) is equipped with an antenna portion 151, a tuner portion 152, an A/D converting portion 153, a demodulating portion 154, and a transport stream (TS) demultiplexer 155, and receives television broadcast to demodulate it.

The antenna portion 151 receives television broadcast wave. The tuner portion 152 selects a broadcast of a channel that is set in advance (or is received through the remote controller 3) from the television broadcast wave which is received by the antenna portion 151. The A/D converting portion 153 converts analog output signal from the tuner portion 152 into digital information. The demodulating portion 154 demodulates output information from the A/D converting portion 153. The TS demultiplexer 155 separates the output information which is demodulated by the demodulating portion 154 and in which a plurality of kinds of information exist, with respect to each king to output.

The audio output portion 16 is equipped with a D/A converting portion 161 and an audio signal output portion 162 and outputs audio signal corresponding to the television broadcast which is received by the receiving portion 15 to the speaker 22. The D/A converting portion 161 converts the audio information which is output from the TS demultiplexer 155 and which is digital information into analog signal. The audio signal output portion 162 outputs the audio signal which is converted into analog signal by the D/A converting portion 161 to the speaker 22.

The MPEG2 decoding portion 17 decodes the video information which is output from the TS demultiplexer 155 to video information which is before compression.

The video output portion 18 is equipped with a National Television Standards Committee (NTSC) encoding portion 181, and a video signal output portion 182 and outputs the video signal which is decoded by the MPEG2 decoding portion 17 to the display 21. The NTSC encoding portion 181 converts the video information which is decoded by the MPEG2 decoding portion 17 into television signal in NTSC system. The video signal output portion 182 outputs the television signal in NTSC system which is output from the NTSC encoding portion 181 to the display 21.

The external device connecting portion 19 is equipped with the HDMI ports 191, 192 and an HDMI communicating portion 193 to perform the authentication process to the external device 4 according to the HDMI standard, and to receive the video information and the audio information from the external device 4 to which the authentication process succeeded. The HDMI ports 191, 192 (corresponding to input terminal) are the input terminals which conform to the HDMI standard, respectively. The HDMI communicating portion 193 performs the authentication process in the HDCP system to the external device 4 such as the DVD player which is connected through the HDMI ports 191, 192 in compliance with a command from the MPU 11 (corresponding to an authentication execution commanding portion 112 which will be explained later), and receives the video information and the audio information from the external device 4 to which the authentication process succeeded.

In this embodiment, the external device connecting portion 19 is equipped with two pieces of the HDMI ports 191, 192. Each of the external devices 41, 42 is connected to each of the HDMI ports 191, 192 in communicatable manner through HDMI cable which is not shown in the drawing.

Next, explanation will be given about an operation when the digital broadcast receiving apparatus 1 receives a broadcast. First, digital broadcast wave which is transmitted is received by the antenna portion 151. When tuning operation is received through the operating portion 14 (or the remote controller 3), switching of transponder through which the broadcast is received is performed by the tuner portion 152. The digital broadcast wave which is received is converted into digital information by the A/D converting portion 153 and is demodulated by the demodulating portion 154.

The digital broadcast wave is transmitted as a TS packet from transmitting side (transmitting station). This TS packet contains the video information, the audio information, control information, and the like, and these information are separated by the TS demultiplexer 155 and output to the RAM 12 to be stored. Then, the audio information which is read out from the RAM 12, is converted into analog signal by the D/A converting portion 161, and sound is output from the speaker 22 through the audio signal output portion 162.

The video information which is read out from the RAM 12, is decoded to video information that is before compression by the MPEG2 decoding portion 17, then it is converted into television signal in the NTSC system by the NTSC encoding portion 181 and image is displayed on the display 21 through the video signal output portion 182.

Figure 2:
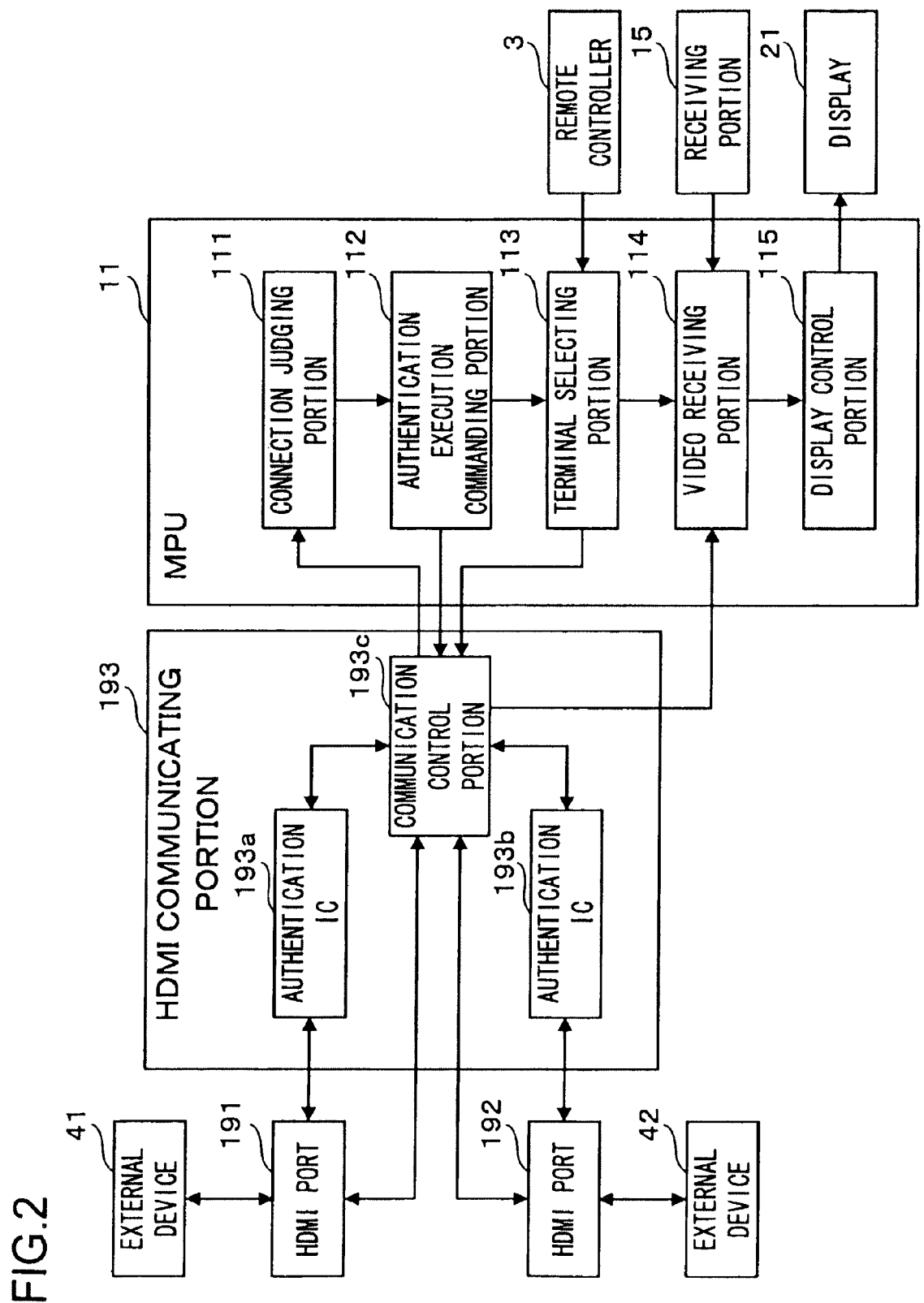
FIG. 2 is a block diagram to show one example of structure of a principal part of the digital broadcast receiving apparatus according to one embodiment of the present invention.

FIG. 2 is a block diagram to show one example of structure of a principal part of the digital broadcast receiving apparatus 1 according to one embodiment of the present invention. The HDMI communicating portion 193 is equipped with authentication ICs 193a, 193b, and a communication control portion 193c. Further, the MPU 11 is equipped with a connection judging portion 111, an authentication execution commanding portion 112, a terminal selecting portion 113, a video receiving portion 114, and a display control portion 115 as function portions.

In the present embodiment, the MPU11 reads out a control program which is stored in advance in the ROM 13 and the like shown in FIG. 1 and executes it, as a result, the connection judging portion 111, the authentication execution commanding portion 112, the terminal selecting portion 113, the video receiving portion 114, and the display control portion 115 are realized as function portions.

Further, among the various kinds of data stored in the RAM 12 and the ROM 13 that are shown in FIG. 1, the data which can be stored in a removable recording medium may be read by drivers such as a hard disk drive, an optical disc drive, a flexible disk drive, a silicon disc drive, a cassette media read-out system. In such case, the recording medium is, for example, a hard disk, an optical disc, a flexible disk, a compact disc (CD), a digital versatile disc (DVD), a semiconductor memory, or the like.

The authentication ICs 193a, 193b (corresponding to a part of authentication executing unit) perform respectively the authentication process of the HDCP system to the external devices 41, 42 through the HDMI ports 191, 192.

To be more concrete, when it is judged by the connection judging portion 111 that the external device 4 (41, 42) is connected, the authentication ICs 193a, 193b which correspond to the HDMI ports 191, 192 which is judged to be connected to the external device 4 (41, 42), begins execution of the authentication process to the connected external device 4 (41, 42). Then, when an initial process of the authentication process is completed, a state where the authentication is completed is held by the authentication IC. That is, exchange of an authentication key is continuously performed with the external device 4 (41, 42). At this point, the initial process of the authentication process is a process in that exchange of an authentication key can be performed continuously with the external devices.

The communication control portion 193c (corresponding to a part of the connection judging unit, a part of the authentication executing unit, a part of the terminal selecting unit, and a part of video receiving unit) judges whether, or not, the external device 4 (41, 42) is connected to each of the HDMI ports 191, 192, in compliance with the command from the connection judging portion 111. Further, the communication control portion 193c makes the authentication ICs 193a, 193b execute the authentication process in compliance with the command from the authentication execution commanding portion 112.

Further, the communication control portion 193c sets the HDMI ports 191, 192 to receive the video information in compliance with the command from the terminal selecting portion 113. In addition, the communication control portion 193c receives the video information from the external device 4 (41, 42) and decodes the received video information in compliance with the command from the video receiving portion 114.

The connection judging portion 111 (corresponding to a part of the connection judging unit) judges whether, or not, the external device 41, 42, is connected to each of the HDMI ports 191, 192, for every HDMI ports 191, 192 through the communication control portion 193c.

When it is judged by the connection judging portion 111 that the external device 4 (41, 42) is connected, the authentication execution commanding portion 112 (corresponding to a part of the authentication executing unit) makes the authentication ICs 193a, 193b which correspond to the HDMI ports 191, 192 that is judged to be connected with external device 4 (41, 42), perform the authentication process to the connected external device 4 (41, 42).

The terminal selecting portion 113 (corresponding to a part of the terminal selecting unit) receives an operation input from user through the remote controller 3, selects one of the video information that is received through the receiving portion 15, and the video information that is input from the external device 4 (41, 42) through the HDMI ports 191, 192 which are selected as the video input terminal as the video information that is output to the display 21 based on the received operation input, and selects the HDMI port from the HDMI ports 191, 192 as the video input terminal which is a terminal to which the video information is input.

That is, the terminal selecting portion 113 selects one video information as the video information which is output to the display 21 from the video information that is received through the receiving portion 15, the video information that is input from the external device 41 through the HDMI port 191, and the video information that is input from the external device 42 through the HDMI port 192.

When the video information input to the HDMI port 191 (or the HDMI port 192) is selected by the terminal selecting portion 113 as an video information that is output to the display 21, the video receiving portion 114 (corresponding to a part of the video receiving unit) receives the video information through the authentication IC 193a (or the authentication IC 193b) which corresponds to the selected HDMI port 191 (or the HDMI port 192) from the external device 41 (or the external device 42) that is connected through the selected HDMI port 191 (or the HDMI port 192).

Further, when the video information which is received through the receiving portion 15 is selected by the terminal selecting portion 113 as the video information that is output to the display 21, the video receiving portion 114 receives the video information through the receiving portion 15.

To be more concrete, the video receiving portion 114 judges whether, or not, the initial process of the authentication process to the external device 41 (or the external device 42) connected through the selected HDMI port 191 (or HDMI port 192) is completed when one HDMI port 191 (or HDMI port 192) is selected by the terminal selecting portion 113. In case where it is judged that the initial process of the authentication process is completed, the video receiving portion 114 receives the video information from the external, device 41 (or the external device 42) which is connected through the selected HDMI port 191 (or HDMI port 192). On the other hand, in case where it is judged that the initial process of the authentication process is not completed, the video receiving portion 114 waits till the initial process of the authentication process is completed by the authentication IC 193a (or the authentication IC 193b) which corresponds to the selected HDMI port 191 (or the HDMI port 192), and the process is interrupted.

The display control portion 115 (corresponding to a display control unit) outputs the video information which is received by the video receiving portion 114 to the display 21.

Figure 3:
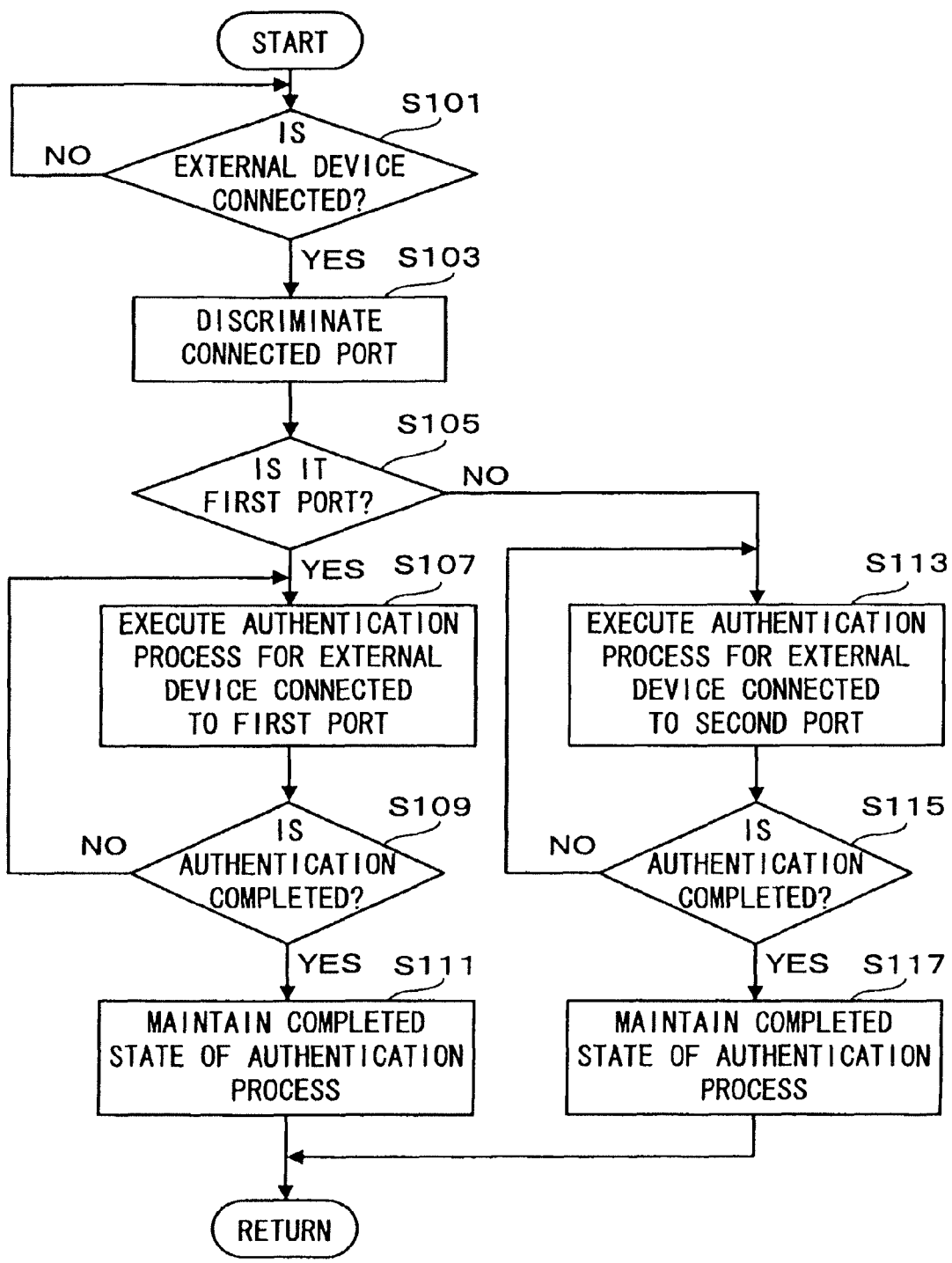
FIG. 3 is a flowchart to show one example of an authentication operation of the digital broadcast receiving apparatus according to one embodiment of the present invention.

FIG. 3 is a flowchart to show one example of an authentication operation of the digital broadcast receiving apparatus 1 (mainly MPU 11) according to one embodiment of the present invention. First, it is judged by the connection judging portion 111 whether, the external device 41, 42 is connected to the HDMI ports 191, 192 (S101). In case where it is judged that the external device 41, 42 is not connected (NO in S101), the process is made in a waiting state. In case where it is judged that the external device 41, 42 is connected, that is, it is changed from an unconnected state to a connected state (YES in S101), a judgment is performed by the connection judging portion 111 whether, or not, the port to which the external device 41, 42 is connected is the HDMI port 191, (S105).

In case where it is judged that the connected port is not the HDMI port 191 (NO in S105), the process proceeds to step S113. In case where it is judged that the connected port is the HDMI port 191 (YES in S105), the authentication process to the external device 41 connected through the authentication IC 193*a* is performed by the authentication execution commanding portion 112 (S107). Then, a judgment is performed whether, or not, the initial process of the authentication process is completed by the authentication IC 193*a* (S109). In case where it is judged that the initial process of the authentication process is not completed (NO in S109), the process is returned to step S107, and the process after S107 is performed repeatedly. In case where it is judged that the initial process of the authentication process is completed (YSE in S109), a state where the authentication is completed is maintained by the authentication IC 193*a*, that is, exchange of the authentication key is performed continuously along with the external device 41 (S111), then the process is returned.

In case where it is judged that the connected port is not the HDMI port 191 (NO in S105), the authentication process to the external device 42 connected through the authentication IC 193*b* is performed by the authentication execution commanding portion 112 (S113). Then, a judgment is performed whether, or not, the initial process of the authentication process is completed by the authentication IC 193*b* (S115). In case where it is judged that the initial process of the authentication process is not completed (NO in S115), the process is returned to step S113, and the process after S113 is performed repeatedly. In case where it is judged that the initial process of the authentication process is completed (YES in S115), a state where the authentication is completed is maintained by the authentication IC 193*b*, that is, exchange of the authentication key is performed continuously along with the external device 42 (S117), then the process is returned.

Figure 4:
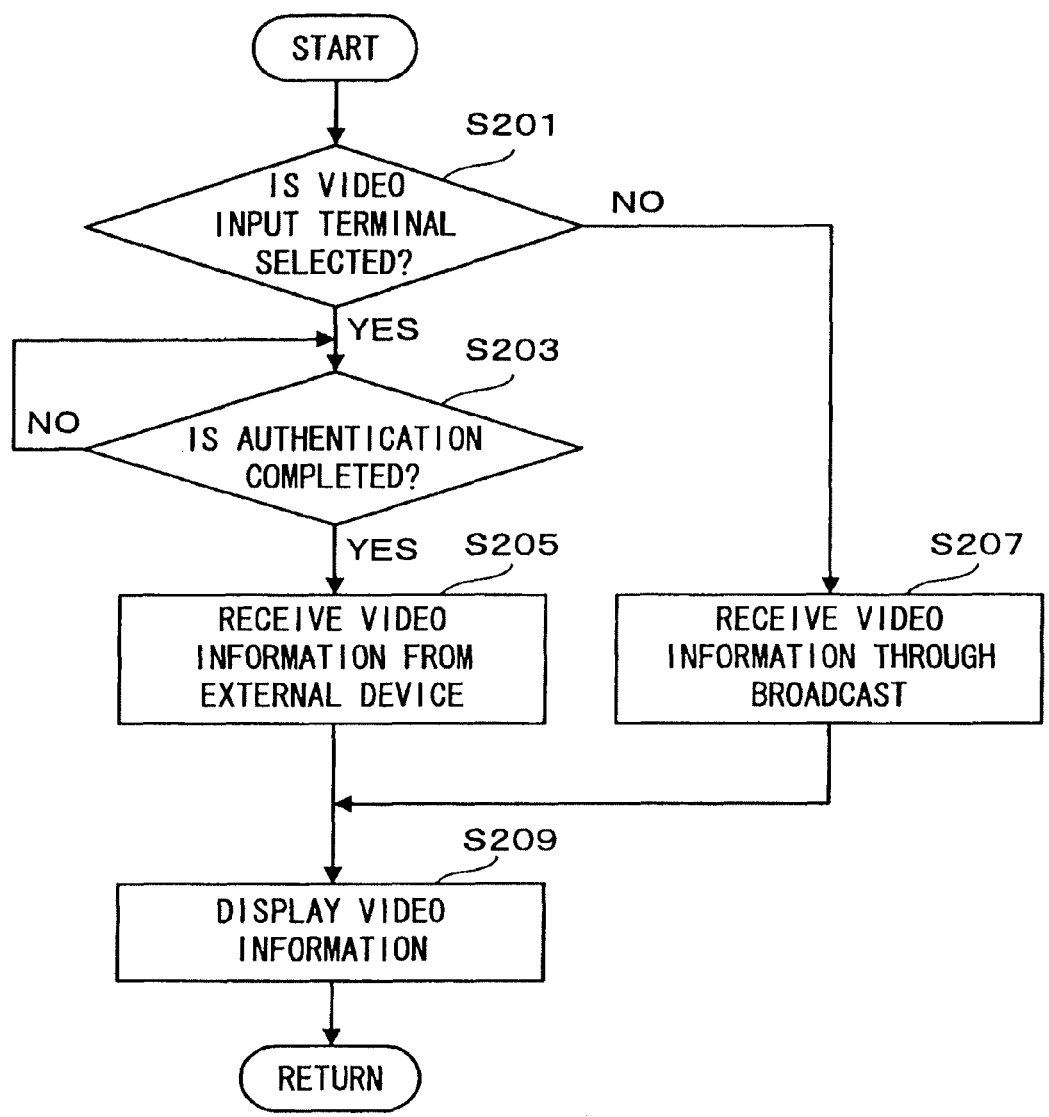
FIG. 4 is a flowchart to show one example of an image display operation of the digital broadcast receiving apparatus according to one embodiment of the present invention.

FIG. 4 is a flowchart to show one example of an image display operation of the digital broadcast receiving apparatus 1 (mainly MPU 11) according to one embodiment of the present invention. First, a judgment is performed by the terminal selecting portion 113 whether, or not, the video information that is input from the external device 41 (or the external device 42) through the HDMI port 191 (or the HDMI port 192) is selected as the video information that is output to the display 21 (S201). In case where it is judged that the video information that is input from the external device 41 (or the external device 42) through the HDMI port 191 (or the HDMI port 192) is not selected, that is, the video information which is received through the receiving portion 15 is selected, the process proceeds to step S207.

In case where it is judged that the video information that is input from the external device 41 (or the external device 42) through the HDMI port 191 (or the HDMI port 192) is selected, a judgment is performed by the video receiving portion 114 whether, or not, the initial process of the authentication process to the authentication IC 193*a* (or authentication IC 193*b*) corresponding to the HDMI port 191 (or HDMI port 192) selected in step S201, is completed. That is, a judgment is performed whether, or not, a state where exchange of the authentication key is executed continuously along with the external device 41 (or the external device 42) (S203). In case where it is judged that the initial process of the authentication process is not completed (NO in S203), the process is made in the waiting state. In case where it is judged that the initial process of the authentication process is completed (YES in S203), the video information is received from the external device 41 (or external device 42) by the video receiving portion 114 (S205). Then, the video information which is received in step S205 is displayed on the display 21 by the display control portion 115 (S209), and the process is returned.

In case where result is NO in step S201, the video information which is received through the receiving portion 15, is received by the video receiving portion 114 (S207). Then, the video information which is received in step S207, is displayed on the display 21 by the display control portion 115 (S209), and the process is returned.

As above described, the authentication process to the external device connected to each of a plurality of HDMI ports (two HDMI ports in this embodiment) is performed by each of a plurality of authentication ICs (two authentication ICs in this embodiment). Then, the operation input from user is received through the remote controller, and the HDMI port to which the authentication process is completed, is selected from the plurality of HDMI ports (two HDMI ports in this embodiment) as the video input terminal that is a terminal to which the video information is input based on the received operation input. The video information is received from the external device which is connected through the selected HDMI port, through the authentication IC which corresponds to the selected HDMI port, and the received video information is output to the display. As a result, waiting time till the image is displayed on the display can be reduced.

That is, because the authentication process to the external device connected to each of a plurality of HDMI ports (two HDMI ports in this embodiment) is performed in advance by each of a plurality of authentication ICs (two authentication ICs in this embodiment), in case where the HDMI port is selected as the video input terminal that is a terminal to which the video information is input, it is not necessary that the authentication process is started from a time point when it is selected, the waiting time till the image is displayed on the display can be reduced.

That is, if the authentication process to the external device connected to the HDMI port is performed in advance by the authentication IC corresponding to the HDMI port at the time point when the external device is connected to the HDMI port, for example, the authentication process is completed (or the authentication process is being performed) at the time point when the HDMI port is selected as the video input terminal that is a terminal to which the video information is input. Therefore, it is not necessary that the authentication process is started from the time point when the HDMI port is selected.

Further, an input terminal according to the HDMI standard, that is, the HDMI port can perform digital communication according to the HDMI standard with the external device.

Still further, if the authentication process in the HDCP system is performed, illegal copy can be prevented surely.

In addition, when it is judged whether, or not, the external device is connected to each of a plurality of HDMI ports (two HDMI ports in this embodiment), as a result in case where it is judged that the external device is connected to the HDMI port, and if the authentication process to the connected external device is performed by the authentication IC corresponding to the HDMI port that is judged to be connected to the external device, the waiting time till the image is displayed on the display 21 can be surely reduced.

That is, because the authentication process to the external device connected to each of a plurality of the HDMI ports (two HDMI ports in this embodiment) is performed by each of a plurality of authentication ICs (two authentication ICs in the embodiment described above), it is not necessary to start the authentication process from the time point when the HDMI port is selected as a video input terminal that is a terminal to which the video information is input. As a result, the waiting time until the image is displayed on the display can be surely reduced.

That is, because the authentication process is already completed (or the authentication process is being performed) at the time point when the HDMI port is selected as the video input terminal that is a terminal to which the video information is input, by performing the authentication process in advance to the external device that is connected to the HDMI port utilizing the authentication IC which corresponds to the HDMI port, at the time point when the external device is connected to the HDMI port, it is not necessary that the authentication process is started from the time point when the HDMI port is selected.

Further, because the video receiving apparatus is equipped with the authentication ICs which perform respectively the authentication process to the external device, and the authentication process is performed through the authentication IC, the waiting time till the image is displayed on the display can be more surely reduced.

That is, because the video receiving apparatus is equipped with the authentication ICs which perform respectively the authentication process to the external device, the authentication process is performed in advance through the authentication IC, and when the authentication is completed by the authentication IC, the state where the authentication has been completed can be maintained. That is, because the exchange of the authentication key with the external device can be performed continuously, the waiting time until the image is displayed on the display can be more surely reduced.

At this point the present invention can be applied to below described aspects. (A) In the above described embodiment, explanation is given about a case where the video receiving apparatus is a digital broadcast receiving apparatus. However, the video receiving apparatus may be an apparatus equipped with a plurality of input terminals and configured such that it can output to the display the video information which is input from the external device through a input terminal that is selected from the plurality of input terminals. That is, the video receiving apparatus may not be equipped with the receiving portion which receives the digital broadcast.

(B) In the above described embodiment, explanation is given about a case where the video receiving apparatus is a digital broadcast receiving apparatus. The video receiving apparatus may be configured to receive the television broadcast and output to a display at least one of received video information and the video information which is input from an external device through an external device connecting portion. That is, the broadcast receiving apparatus may receive the television broadcast in analog system or the broadcast receiving apparatus may receive the television broadcast both in the analog system and the digital system.

(C) In the above described embodiment, explanation is given about a case where the external device connecting portion has two HDMI ports. However, the external device connecting portion may have three HDMI ports or more.

(D) In the above described embodiment, explanation is given about a case where the input terminal is the HDMI port according to the HDMI standard. However, the input terminal may be any kind of input terminals to communicate digital signal. For example, the input terminal may be a DVD port according to the Digital Visual Interface (DVI) standard.

(E) In the above described embodiment, explanation is given about a case where the authentication IC performs the authentication process of the HDCP system. The authentication IC may perform the authentication process of other system.

(F) In the above described embodiment, explanation is given about a case where the MPU is equipped with the connection judging portion, the authentication execution commanding portion, the terminal selecting portion, the video receiving portion, the display control portion, and the like as the function portions. At least one of function portion among the connection judging portion, the authentication execution commanding portion, the terminal selecting portion, the video receiving portion, and the display control portion may be realized by a hardware such as circuit.

What is claimed is:

1. A video receiving apparatus comprising:
    a plurality of input terminals, of which at least one complies with High-Definition Multimedia Interface (HDMI) standard;
    an authentication executing unit which performs an authentication process in High-bandwidth Digital Content Protection (HDCP) system to an external device connected to the at least one input terminal complying with the HDMI standard;
    a terminal selecting unit which selects one of the plurality of input terminals as a video input terminal based on an operation input from outside;
    a video receiving unit that judges whether the authentication process is completed,
    such that if the authentication process is judged complete, the video receiving unit receives video information through one of the authentication executing units corresponding to the selected input terminal from the external devices connected through the selected input terminal, and if the authentication process is judged incomplete, the video receiving unit waits until the authentication process is completed; and
    a display control unit which outputs the video information received by the video receiving unit to a monitor,
    wherein when an initial process of the authentication process is completed, the authentication executing unit holds a state where exchange of an authentication key is continuously preformed with the external devices,
    wherein the video receiving apparatus further comprises:
    a communication control portion which controls communication; and
    a connection judging unit which judges whether, or not, each of the plurality of input terminals is connected to the external devices, and
    wherein the authentication executing unit or authentication executing units that correspond(s) to the input terminal or input terminals judged to be connected with the external devices by the connection judging unit directly instructed by the communication control portion, perform(s) the authentication process to the connected external devices and then sends an instruction to the communication control portion.

2. The video receiving apparatus according to claim 1, wherein the input terminals are input terminals according to High-Definition Multimedia Interface (HDMI) standard.

3. The video receiving apparatus according to claim 2, wherein the authentication executing units perform the authentication process in High-bandwidth Digital Content Protection (HDCP) system.

4. The video receiving apparatus according to claim 2, further comprising a connection judging unit which judges whether, or not, each of the plurality of input terminals is connected to the external devices, wherein the authentication executing unit or authentication executing units that correspond(s) to the input terminal or input terminals judged to be connected with the external devices by the connection judging unit, perform(s) the authentication process to the connected external devices.

5. The video receiving apparatus according to claim 2, wherein the authentication executing units include a plurality of authentication Integrated Circuits (ICs), the authentication ICs perform the authentication process to the external devices, and the authentication executing units perform the authentication process through the authentication ICs.

6. The video receiving apparatus according to claim 1, wherein the authentication executing units perform the authentication process in High-bandwidth Digital Content Protection (HDCP) system.

7. The video receiving apparatus according to claim 6, further comprising a connection judging unit which judges whether, or not, each of the plurality of input terminals is connected to the external devices, wherein the authentication executing unit or authentication executing units that correspond(s) to the input terminal or input terminals judged to be connected with the external devices by the connection judging unit, perform(s) the authentication process to the connected external devices.

8. The video receiving apparatus according to claim 6, wherein the authentication executing units include a plurality of authentication Integrated Circuits (ICs), the authentication ICs perform the authentication process to the external devices, and the authentication executing units perform the authentication process through the authentication ICs.

9. The video receiving apparatus according to claim 1, wherein the authentication executing units include a plurality of authentication Integrated Circuits (ICs), the authentication ICs perform the authentication process to the external devices, and the authentication executing units perform the authentication process through the authentication ICs.

10. The video receiving apparatus according to claim 1, wherein the authentication executing units include a plurality of authentication Integrated Circuits (ICs), the authentication ICs perform the authentication process to the external devices, and the authentication executing units perform the authentication process through the authentication ICs.

11. The video receiving apparatus according to claim 1,
wherein the authentication executing unit includes an authentication Integrated Circuit (IC), the authentication IC performs the authentication process to the external device, and the authentication executing unit performs the authentication process through the authentication IC.

12. A broadcast receiving apparatus comprising: a video receiving apparatus including:
a plurality of input terminals, of which at least one complies with High-Definition Multimedia Interface (HDMI) standard;
an authentication executing unit which performs an authentication process in High-bandwidth Digital Content Protection (HDCP) system to an external device connected to at least one input terminal complying with the HDMI standard;
a terminal selecting unit which selects one of the plurality of input terminals as a video input terminal based on an operation input from outside;
a video receiving unit that judges whether the authentication process is completed,
such that if the authentication process is judged complete, the video receiving unit receives video information through one of the authentication executing units corresponding to the selected input terminal from the external devices connected through the selected input terminal, and if the authentication process is judged incomplete, the video receiving unit waits until the authentication process is completed;
a display control unit which outputs the video information received by the video receiving unit to a monitor; and
a broadcast receiving unit which receives a television broadcast, wherein
the broadcast receiving apparatus outputs at least one of video information received through the broadcast receiving unit or the video information input from the external devices through the input terminal selected as a video input terminal of the video receiving apparatus to the monitor,
wherein when an initial process of the authentication process is completed, the authentication executing unit holds a state where exchange of an authentication key is continuously preformed with the external devices,
wherein the video receiving apparatus further comprises:
a communication control portion which controls communication; and
a connection judging unit which judges whether, or not, each of the plurality of input terminals is connected to the external devices, and
wherein the authentication executing unit or authentication executing units that correspond(s) to the input terminal or input terminals judged to be connected with the external devices by the connection judging unit directly instructed by the communication control portion, perform(s) the authentication process to the connected external devices and then sends an instruction to the communication control portion.

13. The broadcast receiving apparatus according to claim 12, wherein the input terminals are input terminals according to High-Definition Multimedia Interface (HDMI) standard.

14. The broadcast receiving apparatus according to claim 12,
wherein the authentication executing unit includes an authentication Integrated Circuit (IC), the authentication IC performs the authentication process to the external device, and the authentication executing unit performs the authentication process through the authentication IC.

* * * * *